United States Patent
Johnston et al.

(10) Patent No.: US 9,354,386 B2
(45) Date of Patent: *May 31, 2016

(54) SOLID STATE AREA LIGHT AND SPOTLIGHT WITH LIGHT GUIDE AND INTEGRATED THERMAL GUIDE

(71) Applicant: 3M INNOVATIVE PROPERTIES COMPANY, St. Paul, MN (US)

(72) Inventors: Raymond P. Johnston, Lake Elmo, MN (US); Paul E. Humpal, Stillwater, MN (US); Robert L. Brott, Woodbury, MN (US); Karl J. L. Geisler, Saint Paul, MN (US); Martin J. Vos, Minneapolis, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 155 days.

This patent is subject to a terminal disclaimer.

(21) Appl. No.: 14/063,395

(22) Filed: Oct. 25, 2013

(65) Prior Publication Data

US 2015/0117017 A1    Apr. 30, 2015

(51) Int. Cl.
*F21V 29/00* (2015.01)
*F21V 8/00* (2006.01)
*F21K 99/00* (2016.01)
*F21Y 101/02* (2006.01)
(Continued)

(52) U.S. Cl.
CPC .............. *G02B 6/0096* (2013.01); *F21K 9/135* (2013.01); *F21K 9/52* (2013.01); *F21V 29/773* (2015.01); *F21Y 2101/02* (2013.01); *F21Y 2103/022* (2013.01); *G02B 6/0045* (2013.01)

(58) Field of Classification Search
CPC ......... F21K 9/52; F21K 9/135; G02B 6/0096; G02B 6/0045; F21Y 2101/02; F21Y 2103/022; F21V 29/773
USPC ........................................................ 362/294
See application file for complete search history.

(56) References Cited

U.S. PATENT DOCUMENTS 7,144,135 B2   12/2006   Martin
7,160,012 B2   1/2007   Hilscher
(Continued)

FOREIGN PATENT DOCUMENTS

DE   20 2007 009 272   12/2007
EP   2 025 992   2/2009
(Continued)

OTHER PUBLICATIONS

"A Game Changing Technology: ITRI's Wide Angle LED Bulb", The Industrial Technology Research Institute, No. 68, Spring Quarter, pp. 6-7 (2012).

(Continued)

*Primary Examiner* — Anh Mai
*Assistant Examiner* — Hana Featherly

(57) ABSTRACT

A solid state area light and spotlight having a solid state light source such as LEDs, tapered light guides, and external thermal guides. The area light includes a flared light guide, and the spotlight includes a light guide with a closed end. The light guides are coupled to the light source for receiving and distributing light from the light source with the distribution being based in part upon the shape and taper of the light guides. The thermal guide provides for thermal conduction from the light source and dissipating heat through convection and radiation for cooling the light.

24 Claims, 6 Drawing Sheets

(51) Int. Cl.
  *F21Y 103/02* (2006.01)
  *F21V 29/77* (2015.01)

(56) References Cited

U.S. PATENT DOCUMENTS

| | | |
|---|---|---|
| 7,543,957 B1 | 6/2009 | Balazs |
| 7,581,856 B2 | 9/2009 | Kang |
| 7,607,802 B2 | 10/2009 | Kang |
| 7,708,452 B2 | 5/2010 | Maxik |
| 8,360,604 B2 | 1/2013 | Negley |
| 8,487,518 B2 | 7/2013 | Johnston |
| 2004/0201990 A1 | 10/2004 | Meyer |
| 2005/0105302 A1 | 5/2005 | Hofmann |
| 2007/0296350 A1* | 12/2007 | Maxik et al. ............ 315/291 |
| 2008/0253125 A1 | 10/2008 | Kang |
| 2010/0148652 A1 | 6/2010 | Vetrovec |
| 2010/0181888 A1 | 7/2010 | Lu |
| 2010/0215201 A1* | 8/2010 | Kalomirakis et al. ....... 381/345 |
| 2010/0264800 A1 | 10/2010 | Liu |
| 2011/0032708 A1 | 2/2011 | Johnston |
| 2011/0101861 A1 | 5/2011 | Yoo |
| 2011/0298371 A1 | 12/2011 | Brandes |
| 2012/0025687 A1 | 2/2012 | Wen |
| 2012/0106153 A1 | 5/2012 | Huang |
| 2012/0112615 A1 | 5/2012 | Kuenzler |
| 2012/0194054 A1 | 8/2012 | Johnston |
| 2013/0107496 A1 | 5/2013 | Bisberg |
| 2013/0113358 A1 | 5/2013 | Progl |
| 2013/0155719 A1 | 6/2013 | Brott |

FOREIGN PATENT DOCUMENTS

| | | |
|---|---|---|
| WO | WO 2010-058325 | 5/2010 |
| WO | WO 2010-146746 | 12/2010 |
| WO | WO 2012-139358 | 10/2012 |

OTHER PUBLICATIONS

International Search Report for PCT/US2014/060632, mailed Jan. 21, 2015.

* cited by examiner

SOLID STATE AREA LIGHT AND SPOTLIGHT WITH LIGHT GUIDE AND INTEGRATED THERMAL GUIDE

BACKGROUND

The energy efficiency of lighting has become an important consideration in industrial, consumer, and architectural lighting applications. With the advances in solid state light technology, light emitting diodes (LEDs) have become more energy efficient than fluorescent lights. Further, the marketplace has a large established fixture base for Edison, fluorescent and high intensity discharge lights. These types of applications present a significant technical challenge for LEDs due to their inherent point source nature, and the need to operate the LEDs at relatively low temperatures. Today there are many solutions addressing these issues, including fans, thermal sinks, heat pipes and the like. However, these approaches limit the applications by adding complexity, cost, efficiency loss, added failure modes, an undesirable form factor, and light distribution. The need remains to find a solution that can provide optical and electrical efficiency and device lifetime benefits, at attractive manufacturing costs and design.

SUMMARY

A first light with integrated light and thermal guides, consistent with the present invention, includes a light source, a light section, a flared light guide coupled to the light section, and a thermal guide. The light guide has a first surface and a second surface opposite the first surface and an edge between the first and second surfaces. The light guide is in communication to the light source for receiving and distributing light from the light source, and the light is transported within the light guide until the light exits from the first or second surface. The light source is located at the edge of the light guide in order to optically couple the light into the light guide. The light guide has a first end at the edge and a second flared open end opposite the first end. The thermal guide is coupled to the light section external to the light guide for providing thermal conduction from the light source for cooling the light.

A second light with integrated light and thermal guides, consistent with the present invention, includes a light source, a light section, a closed light guide coupled to the light section, and a thermal guide. The light guide has a first surface and a second surface opposite the first surface and an edge between the first and second surfaces. The light guide is in communication to the light source for receiving and distributing light from the light source, and the light is transported within the light guide until the light exits from the first or second surface. The light source is located at the edge of the light guide in order to optically couple the light into the light guide. The light guide has a first end at the edge and a second closed end opposite the first end with the second surface forming an enclosed interior volume. The thermal guide is coupled to the light section external to the light guide for providing thermal conduction from the light source for cooling the light.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of the present invention include high output LED area lights and spotlights having tapered light guides with open or closed ends and external thermal guides. Examples of solid state lights are described in the following, all of which are incorporated herein by reference as if fully set forth: U.S. Pat. No. 8,487,518; and U.S. Patent Applications Publication Nos. 2012/0194054 and 2011/0032708.

Figure 1:
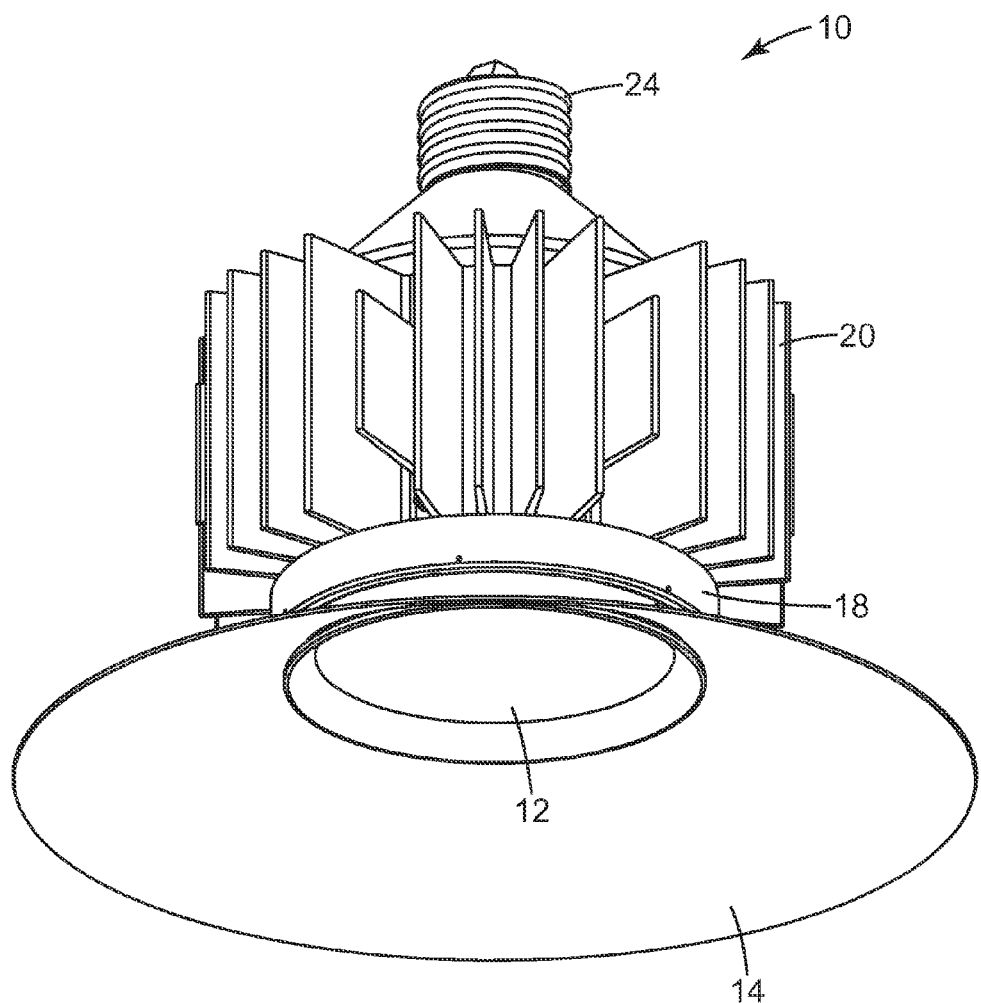
FIG. 1 is a perspective view of a solid state area light, as assembled.
Figure 2:
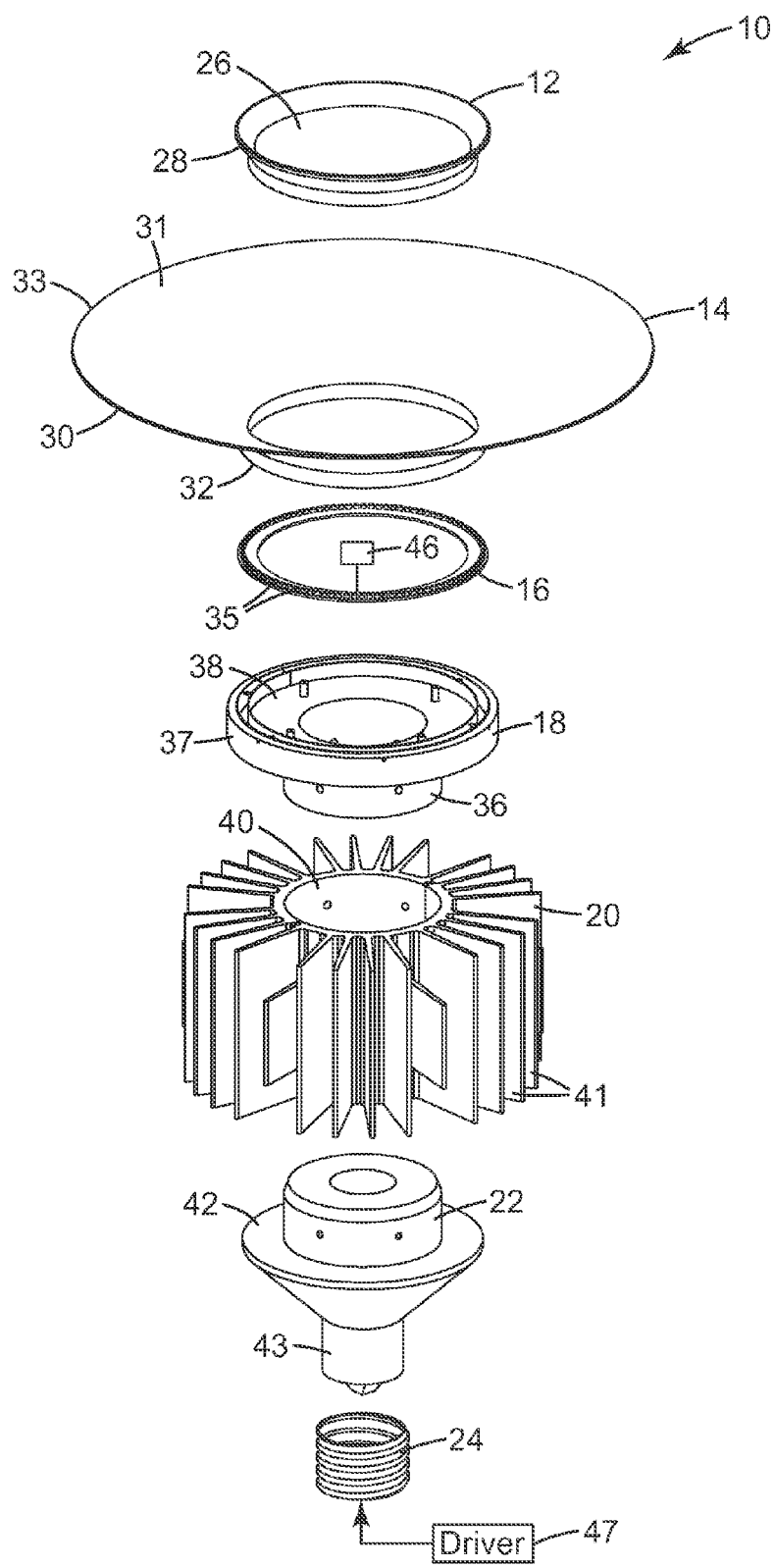
FIG. 2 is an exploded perspective view of the solid state area light.
Figure 3:
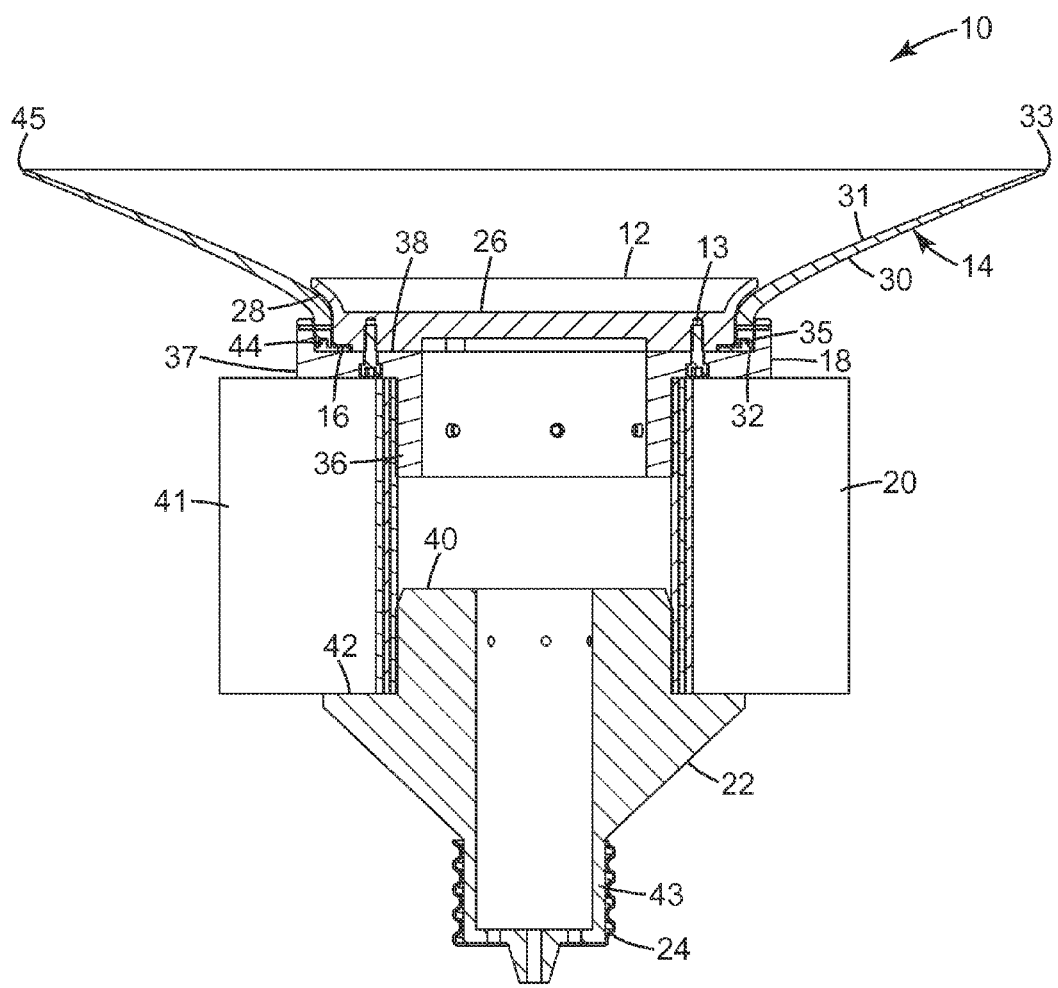
FIG. 3 is a side sectional view of the solid state area light.

FIG. 1 is a perspective view of a solid state area light 10, as assembled. FIGS. 2 and 3 are exploded perspective and side sectional views, respectively, of solid state area light 10. Light 10 includes a cover 12, a light guide 14, a light section 18, a thermal guide 20, and an optional base 24. Light guide 14 has an outer surface 30 and an inner surface 31 opposite outer surface 30. Light guide 14 also has a first end 32 and a second open end 33 opposite first end 32, meaning second end 33 defines an opening to an area created by inner surface 31. The outer and inner surfaces 30 and 31 form edges at first and second ends 32 and 33. Light guide 14 has a flared shape, as shown, meaning the light guide diverges outward from first end 32 to second end 33. Second end 33 of the light guide can optionally be completely or partly covered by a reflective layer 45. An example of a reflective layer is the Enhanced Specular Reflective (ESR) film product from 3M Company, St. Paul, Minn. Other examples of reflective layers include paint, such as white or silver paint, which may be diffusive or specular. Other specular reflective materials can also be used. Alternatively, second end 33 can optionally include a black light absorbing layer.

A light source board 16 includes a plurality of light sources 35. Light sources 35 are located at an edge, for example the edge at first end 32, of the light guide formed by outer and inner surfaces 30 and 31 in order to optically couple light into the light guide. The light is transported in the light guide, for example by total internal reflection, until the light is extracted from outer surface 30, inner surface 31, or both. An optional driver 46 can be located in the light and electrically connected with light source board 16 for driving light sources 35. The internal driver 46, when used, would be electrically connected with a power source via base 24.

Light section 18 includes a surface 38 for supporting light sources 35 on light source board 16 and a portion 37 for supporting outer surface 30 of the light guide adjacent first end 32. In some embodiments, there is no air gap between the edge at first end 32 and light sources 35. For example, the edge at first end 32 can be placed directly against light sources 35, or an optical coupling material 44 can be between and in contact with the edge and light sources 35. Light section 18 also has a core 36 extending from surface 38.

In some embodiments, light section 18 has no apertures (vents) between the light guide and thermal guide 20. In particular, cover 12 has a central portion 26 without vents and a portion 28 that fits against inner surface 31 of the light guide, possibly also creating mechanical interference with the light guide to hold the light guide on section 18. Alternatively, central portion 26 can have apertures (vents) to allow air flow through light section 18. Cover 12 can be secured to light section 18 via pins 13 or other connectors, and pins 13 can also secure light section 18 to thermal guide 20. In some embodiments, light guide 14 can be secured to light section 18 with pins.

Thermal guide 20 is located external to light guide 14, for example on a side of light section 18 opposite from light guide 14. Thermal guide 20 has a core 40 for connection to or placement against core 36 of light section 18 for providing thermal conduction from the light sources 35 for cooling the light. An optional thermal interface material can be included between core 40 and core 36 to facilitate efficient heat transfer. Core 40 could also be used to house an interior driver for a self-ballasted luminaire. Thermal guide 20 has external fins 41 connected with core 40. Alternatively, thermal guide 20 can have an external core with internal fins, or both external and internal fins.

An insulator 22 has a surface 42 for placement against fins 41 or other parts of thermal guide 20. A portion 43 of insulator 22 is coupled to base 24. The light can optionally have an external driver 47 for driving light sources 35. External driver 47, when used, would be electrically connected with a power source and with light sources 35 through an interior of the light. Internal driver 46 or external driver 47 can optionally include a wireless receiver for wirelessly receiving commands to control the operation of the light.

Figure 4:
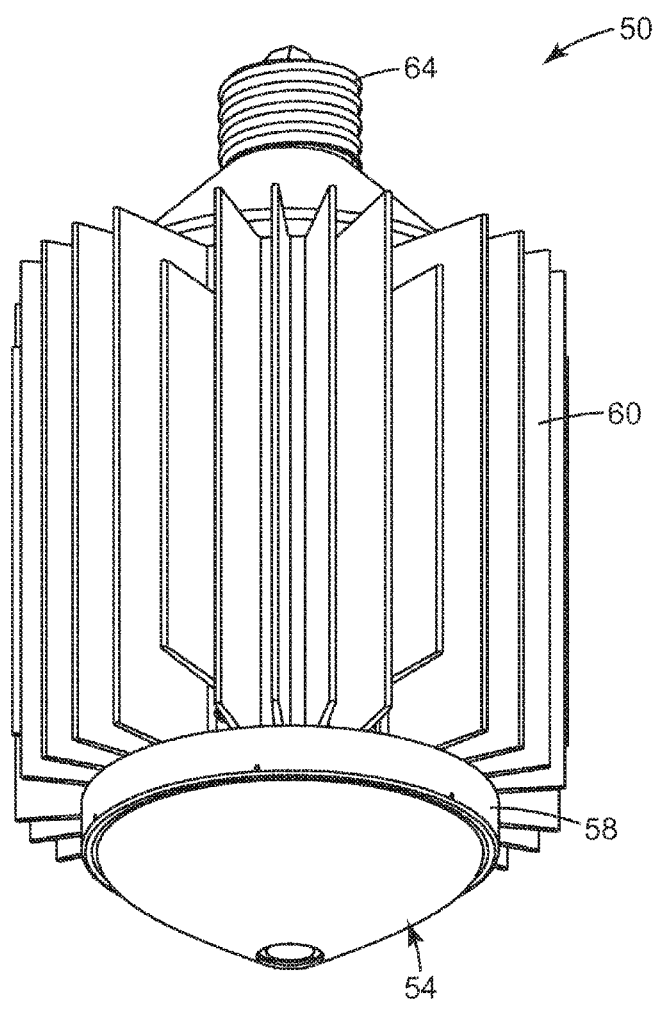
FIG. 4 is a perspective view of a solid state spotlight, as assembled.
Figure 5:
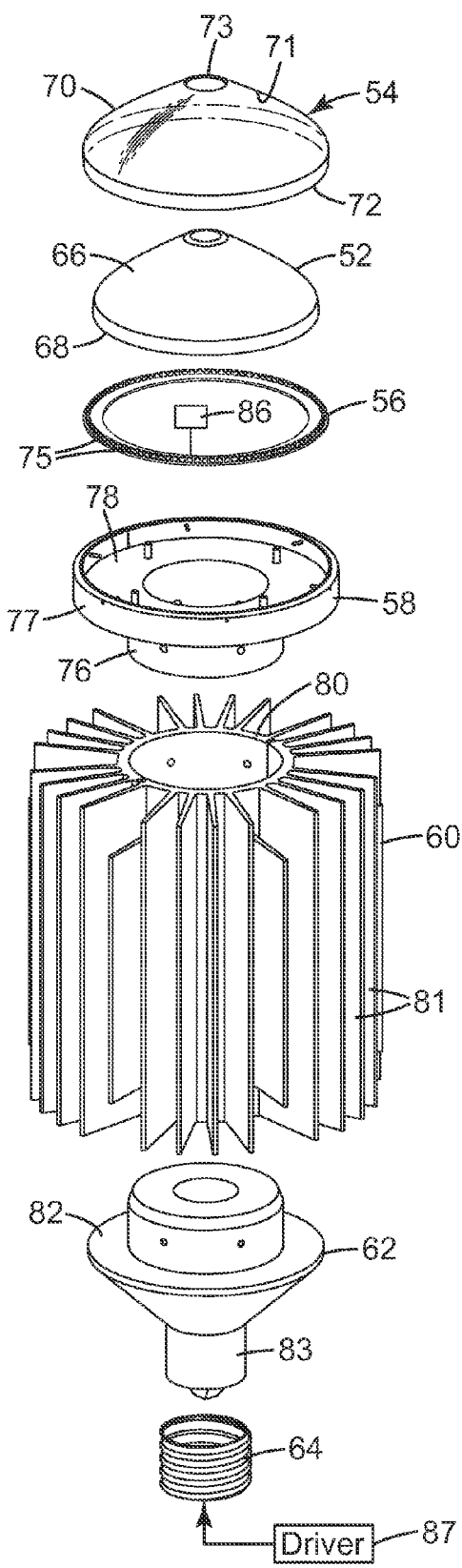
FIG. 5 is an exploded perspective view of the solid state spotlight.
Figure 6:
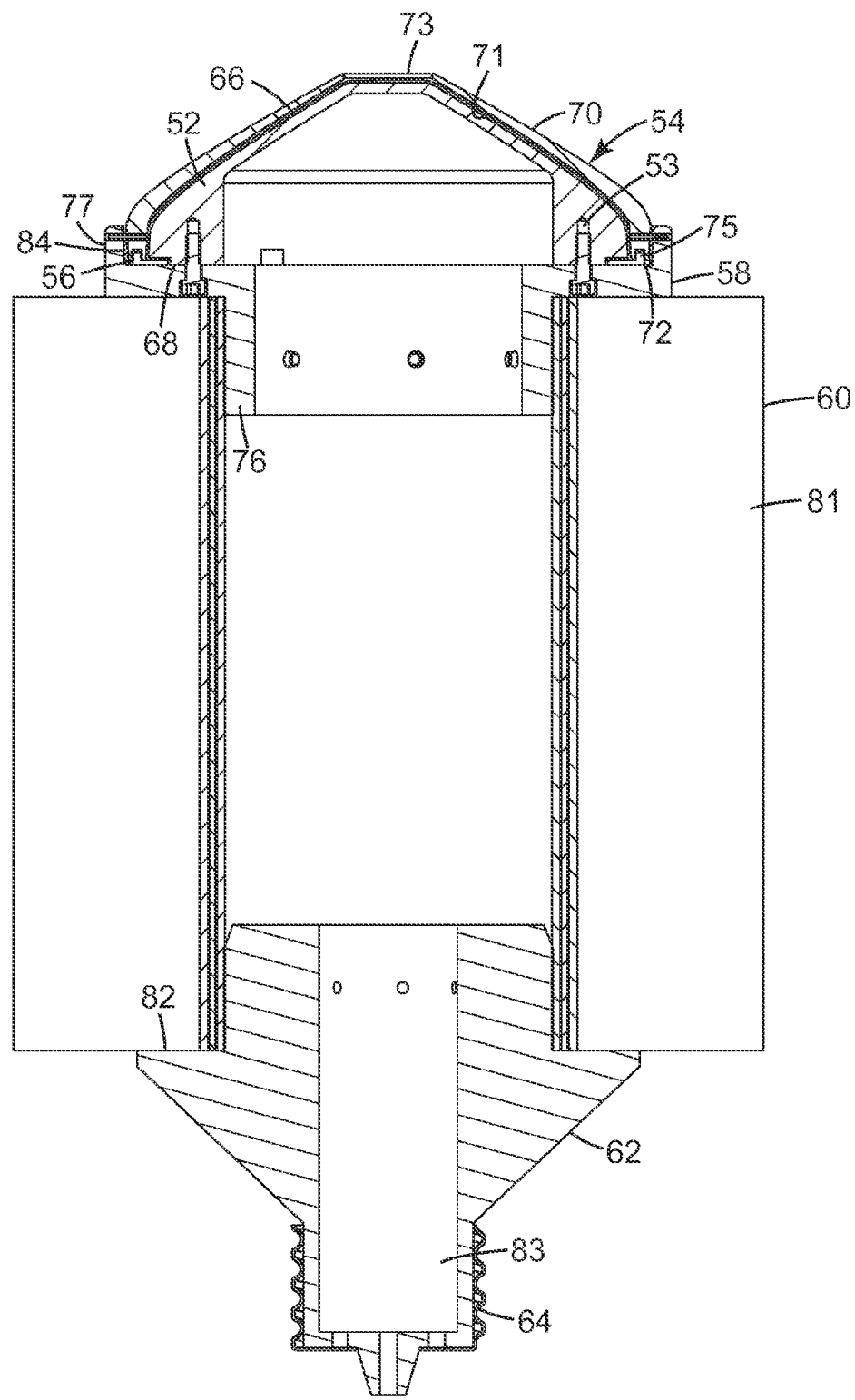
FIG. 6 is a side sectional view of the solid state spotlight.

FIG. 4 is a perspective view of a solid state spotlight 50, as assembled. FIGS. 5 and 6 are exploded perspective and side sectional views, respectively, of solid state spotlight 50. Light 50 includes a light guide 54, a light section 58, a thermal guide 60, and an optional base 64. Light guide 54 has an outer surface 70 and an inner surface 71 opposite outer surface 70. Light guide 54 also has a first end 72 and a second closed end 73 opposite first end 72. With closed second end 73, inner surface 71 can form an enclosed interior volume, meaning the light guide has no apertures (vents) allowing passage of air through the light guide to the interior volume. Alternatively, second end 73 can be an open end, forming an aperture allowing passage of air into the interior volume. If second end 73 is open, it can optionally be completely or partly covered by a reflective layer. Examples of reflective layers include the ESR film product and paint, such as white or silver paint, which may be diffusive or specular. Other specular reflective materials can also be used. Alternatively, second end 73, if open, can optionally include a black light absorbing layer. The outer and inner surfaces 70 and 71 form an edge at first end 72. Light guide 54 has at least a partial cone shape in this embodiment.

A light source board 56 includes a plurality of light sources 75. Light sources 75 are located at an edge, for example the edge at first end 72, of the light guide formed by outer and inner surfaces 70 and 71 in order to optically couple light into the light guide. The light is transported in the light guide, for example by total internal reflection, until the light is extracted from outer surface 70, inner surface 71, or both. An optional driver 86 can be located in the light and electrically connected with light source board 56 for driving light sources 75. The internal driver 86, when used, would be electrically connected with a power source via base 64.

Light section 58 includes a surface 78 for supporting light sources 75 on light source board 56 and a portion 77 for supporting outer surface 70 of the light guide adjacent first end 72. In some embodiments, there is no air gap between the edge at first end 72 and light sources 75. For example, the edge at first end 72 can be placed directly against light sources 75, or an optical coupling material 84 can be between and in contact with the edge and light sources 75. Light section 58 also has a core 76 extending from surface 78.

In some embodiments, a heat spreading dome 52 can be coupled to light section 58 for conducting and dissipating some heat from light sources 75. Heat spreading dome 52 has a base portion 68 for placement on surface 78 and against inner surface 71 of the light guide at first end 72. The outer and inner surfaces 70 and 71 of the light guide at first end 72 can be held between portion 77 of light section 58 and base portion 68 of heat spreading dome 52. A surface 66 of heat spreading dome 52 facing the light guide can substantially conform to the shape of inner surface 71. Surface 66 is also preferably reflective, and most preferably specular. Surface 66 can have, for example, the ESR film product on it. In some applications, it might be desirable to make surface 66 with a color to provide decorative or functional features. Black could be used, for example, to absorb stray light, or a color to enhance the aesthetic beauty. An air gap is formed between at least a portion of heat spreading dome 52 and inner surface 71 the light guide. In some embodiments, the air gap substantially surrounds heat spreading dome 52 between surface 66 and inner surface 71 of the light guide. Surface 66 can have no apertures (vents) allowing passage of air through the surface, or alternatively surface 66 can have vents. Surface 66 can be reflective to visible light. For example, surface 66 can be completely or partly covered by a reflective film such as the ESR film product, or surface 66 can include a reflective coating. Heat spreading dome 52 can be secured to light section 58 via pins 53 or other connectors, and pins 53 can also secure light section 58 to thermal guide 60. In some embodiments, light guide 54 can be secured to light section 58 with pins Thermal guide 60 is located external to light guide 54, for example on a side of light section 58 opposite from light guide 54. Thermal guide 60 has a core 80 for connection to or placement against core 76 of light section 58 for providing thermal conduction from the light sources 75 for cooling the light. An optional thermal interface material can be included between core 80 and core 76 to facilitate efficient heat transfer. Core 80 could also be used to house an interior driver for a self-ballasted luminaire. Thermal guide 60 has external fins 81 connected with core 80. Alternatively, thermal guide 60 can have an external core with internal fins, or both external and internal fins.

An insulator 62 has a surface 82 for placement against fins 81 or other parts of thermal guide 60. A portion 83 of insulator 62 is coupled to base 64. The light can optionally have an external driver 87 for driving light sources 75. External driver 87, when used, would be electrically connected with a power source and with light sources 75 through an interior of the light. Internal driver 86 or external driver 87 can optionally include a wireless receiver for wirelessly receiving commands to control the operation of the light.

The following are exemplary materials, components, and configurations for the solid state lights described herein.

The light sources can be implemented with LEDs, organic LEDs (OLEDS), or other solid state light sources. The lights can include one light source or multiple light sources. Also, the lights can use non-packaged LED light sources.

The light source boards can be implemented with any board or other component supporting and providing for electrical connection with the light sources. The light source boards can be, for example, a single flexible circuit board to house the light sources and make electrical connections for them. The light source boards can alternatively be implemented with rigid boards, or a combination of flexible and rigid boards.

The drivers can be implemented with any circuit or component capable of receiving power from the power source and driving the light source based upon the received power. The drivers can be implemented with one or more integrated circuit chips, for example. The drivers can include internal driver circuits, external driver circuits, or both. The drivers can optionally be electrically connected with, or include, other components for controlling the light. For example, a motion sensor can be connected with the driver for controlling activation of the light when motion is detected proximate the light. One example is the commercially available motion sensor EKMC 1603113 from Panasonic Corporation of North America (Chesapeake, Va.). As another example, a wireless receiver can be connected with the driver, or implemented as part of the driver, for wirelessly controlling the operation of the light. In particular, the receiver can wirelessly receive commands and provide signals to the driver for controlling the operation of the light based upon the commands. The commands can include, for example, activation of the light (turning it on and off), dimming the light or otherwise controlling the brightness of it, or setting a timer to control activation of the light based upon a particular time or time period. For example, the commercially available wireless receiver WSD01-001 from Leviton Manufacturing Co., Inc. (Tualatin, Oreg.) can be used for on/off and dimming purposes in combination with a wireless switch WSOS-D from the same supplier.

The light section can be implemented with, for example, a metal material such as aluminum. The light section can also be implemented with other metal materials, ceramic materials, thermally conductive polymers, or combinations of such materials. The light section can function as a heat sink, and a size of the light section can be adjusted to dissipate a particular amount of heat from the light. The light section can have a round or circular shape, as shown, or other shapes depending upon the shape of the light guide, for example. The light section can have a common configuration to be interchangeable between the light guide and cover for the area light and the light guide for the spotlight. The interior of the light section and the light sources can be sealed and watertight by how the components fit together and optionally the use of gasket materials.

The base can be implemented with, for example, an Edison base for use with conventional light bulb sockets or a base configured for connection to other types of light fixture connections. Alternatively, the light could be configured as a luminaire without a fixture interface such as an Edison base.

The thermal guide is in sufficient contact, directly or indirectly, with the light sources in order to conduct and dissipate heat from the light sources. The thermal guide can be directly in physical contact with the light sources or indirectly in contact with them such as through other components. The thermal guide can be implemented with a metal material such as aluminum. The thermal guide can also be implemented with other metal materials, ceramic materials, thermally conductive polymers, or combinations of such materials. The length of the thermal guide between the light section and insulator can be varied to adjust an amount of heat conduction and dissipation.

The heat spreading dome, when used, can be implemented with a metal material such as aluminum. The heat spreading dome can also be implemented with other metal materials, ceramic materials, thermally conductive polymers, or combinations of such materials. If the heat spreading dome is not used, the spotlight or other such embodiment can have only an external thermal guide without a thermal guide within the interior volume of the light guide.

The light guide can be implemented with, for example, a transparent or translucent material capable of receiving light from the one or more solid state light sources and emitting the light. For example, the light guide can be made of an optically suitable material such as acrylic, polycarbonate, polyacrylates such as polymethyl methacrylate, polystyrene, glass, or any number of different plastic materials having sufficiently high refractive indexes and transmittance. The material can be cast or molded, for example, to form the light guide. The surfaces of the light guide can optionally be polished. The light guide can optionally include bulk scatter elements, such as particles within the light guide, to provide for a soft glow appearance when the light guide is illuminated by the solid state light sources.

The light guide can be composed of multiple portions adhered together with, for example, an adhesive or mechanical snap fit. The portions, when used, can be permanently adhered together or removably attached together. Alternatively, the light guide can be a single unitary piece of material.

The light guide can optionally be tapered. The optional taper can include the light guide being fully tapered with a non-uniform thickness throughout the light guide or being partially tapered with a portion of the light guide having a non-uniform thickness and another portion having a uniform thickness. As an example, the light guide, or a portion of it, can become thinner in portions more distant from the light section.

The taper and shape of the light guide can be used, at least in part, to extract light from the light guide. The flared light guide for the area light can have straight sides between the first and second ends, curved sides, or partially straight and curved sides. The shape of the flared light guide for the area light can be used to predominantly extract light from the inner surface and substantially spread the light. The light guide for the spotlight can have a partial cone shape, as shown, or other shapes having a closed end and creating a decreasing interior volume from the first end to the second end of the light guide. The shape of the closed end light guide for the spotlight can be used to predominantly extract light from the outer surface without substantial spreading of the light. An example of a shaped light guide functioning as a luminaire is disclosed in U.S. Patent Application Publication No. 2013/0155719, which is incorporated herein by reference as if fully set forth. The terms area light and spotlight are used only to identify exemplary embodiments.

The light guide can include optional coatings such as an ultraviolet (UV) coating on its outer surface. The light guide may also incorporate a UV absorber in the bulk polymer used to make the light guide. Furthermore, the light guide can include a matrix material that can contain light frequency shifting chromaphores to obtain a more desirable color rendering index, and examples of matrix stabilized dyes are described in U.S. Pat. No. 5,387,458, which is incorporated herein by reference as if fully set forth. Also, the light can include such a matrix material on any component where light from the light sources interacts with the matrix material.

The invention claimed is:

1. A light with integrated light and thermal guides, comprising:
   a light source;
   a light section having a first side and a second side opposite the first side;
   a light guide, coupled to the second side of the light section, comprising a material having a first surface and a second surface opposite the first surface and a first end at a first edge between the first and second surfaces and a second open end at a second edge between the first and second surfaces opposite the first end, wherein the light guide is in communication to the light source for receiving and distributing light from the light source, and the light is transported within the light guide until the light exits from the first or second surface, wherein the light source is located at the first edge of the light guide in order to optically couple the light into the light guide at the first edge, wherein the light guide has a flared shape where the light guide diverges outward from the first end to the second end with the second end having a larger opening at the second edge to an area created by the second surface than the first end at the first edge; and a thermal guide coupled to the light section external to the light guide for providing thermal conduction from the light source for cooling the light.

2. The light of claim 1, wherein the light source comprises one or more of the following: a light emitting diode; and an organic light emitting diode.

3. The light of claim 1, wherein the thermal guide is coupled to the first side of the light section, and further comprising a base coupled to the thermal guide on a side opposite the light section and configured for connection to a power source.

4. The light of claim 1, wherein the light guide is tapered with a thickness of the light guide decreasing from the first end to the second end.

5. The light of claim 1, further comprising a reflective film on the second end of the light guide.

6. The light of claim 1, wherein the thermal guide has a central core with external fins.

7. The light of claim 1, further comprising an optical coupling material between and in contact with the light source and the first edge of the light guide.

8. The light of claim 1, further comprising a cover on the second side of the light section and adjacent the first end of the light guide.

9. The light of claim 8, wherein the entire cover has no apertures allowing passage of air into an interior of the light section.

10. The light of claim 8, further comprising connectors securing the cover to the light section, wherein the cover has mechanical interference with the light guide to hold the light guide on the light section, and the mechanical interference comprises a portion of the cover that fits against the second surface of the light guide.

11. The light of claim 1, wherein the material of the light guide comprises polycarbonate.

12. The light of claim 1, further comprising a driver electrically connected with the light source, wherein the driver comprises a wireless receiver for wirelessly receiving commands to control operation of the light.

13. A light with integrated light and thermal guides, comprising:
a light source;
a light section having a first side and a second side opposite the first side;
a light guide, coupled to the second side of the light section, comprising a material having a first surface and a second surface opposite the first surface and an edge between the first and second surfaces, wherein the light guide is in communication to the light source for receiving and distributing light from the light source, and the light is transported within the light guide until the light exits from the first or second surface, wherein the light source is located at the edge of the light guide in order to optically couple the light into the light guide at the edge, wherein the light guide has a first end at the edge and a second closed end opposite the first end with the second surface forming an enclosed interior volume where the light guide is aperture-free; and a thermal guide coupled to the light section external to the light guide for providing thermal conduction from the light source for cooling the light.

14. The light of claim 13, wherein the light source comprises one or more of the following: a light emitting diode; and an organic light emitting diode.

15. The light of claim 13, wherein the thermal guide is coupled to the first side of the light section, and further comprising a base coupled to the thermal guide on a side opposite the light section and configured for connection to a power source.

16. The light of claim 13, wherein the light guide is tapered with a thickness of the light guide decreasing from the first end to the second end.

17. The light of claim 13, wherein the thermal guide has a central core with external fins.

18. The light of claim 13, further comprising an optical coupling material between and in contact with the light source and the edge of the light guide.

19. The light of claim 13, further comprising a heat spreading dome adjacent the second surface of the light guide, wherein the heat spreading dome is located within the interior volume and has a surface facing the second surface of the light guide.

20. The light of claim 19, wherein an air gap is formed between at least a portion of the surface of the heat spreading dome and the second surface of the light guide.

21. The light of claim 19, further comprising connectors securing the heat spreading dome to the light section, wherein the first and second surfaces of the light guide are held between a portion of the light section and a base portion of the heat spreading dome.

22. The light of claim 13, wherein the light guide has at least a partial cone shape.

23. The light of claim 13, wherein the material of the light guide comprises polycarbonate.

24. The light of claim 13, further comprising a driver electrically connected with the light source, wherein the driver comprises a wireless receiver for wirelessly receiving commands to control operation of the light.

* * * * *